(12) United States Patent
Hebert

(10) Patent No.: US 12,366,263 B2
(45) Date of Patent: Jul. 22, 2025

(54) ADJUSTABLE BALL JOINT FOR AN INNER TIE ROD ASSEMBLY, ADJUSTABLE BALL JOINT KIT, AND METHOD OF ASSEMBLING AN ADJUSTABLE BALL JOINT

(71) Applicant: Brute Performance Inc, Powell, TN (US)

(72) Inventor: James Hebert, Powell, TN (US)

(73) Assignee: Brute Performance, Inc, Powell, TN (US)

( * ) Notice: Subject to any disclaimer, the term of this patent is extended or adjusted under 35 U.S.C. 154(b) by 452 days.

(21) Appl. No.: 17/987,500

(22) Filed: Nov. 15, 2022

(65) Prior Publication Data

US 2024/0159264 A1    May 16, 2024

(51) Int. Cl.
*F16C 11/06* (2006.01)

(52) U.S. Cl.
CPC ...... *F16C 11/0642* (2013.01); *F16C 11/0623* (2013.01); *F16C 11/068* (2013.01); *Y10T 403/32803* (2015.01)

(58) Field of Classification Search
CPC .............. F16C 11/0614; F16C 11/0619; F16C 11/0623; F16C 11/0642; F16C 11/0661; F16C 11/068; F16C 11/0685; F16C 11/069; F16C 11/0695; Y10T 403/32786; Y10T 403/32795; Y10T 403/32803
See application file for complete search history.

(56) References Cited

U.S. PATENT DOCUMENTS

| | | | | |
|---|---|---|---|---|
| 807,857 | A * | 12/1905 | Palmenberg | F16C 11/0614 403/77 |
| 999,898 | A * | 8/1911 | Stafford | F16C 11/0614 403/77 |
| 1,293,374 | A * | 2/1919 | Dodds | F16B 37/14 411/374 |
| 1,693,840 | A * | 12/1928 | Faudi | F16C 11/0619 403/377 |
| 1,745,704 | A * | 2/1930 | Muncy | F16C 11/068 29/898.1 |
| 1,799,141 | A | 3/1931 | Hufferd et al. | |
| 1,828,891 | A | 10/1931 | Crawford et al. | |
| 1,918,394 | A | 7/1933 | Hufferd et al. | |
| 2,469,541 | A | 5/1949 | Bagge et al. | |

(Continued)

FOREIGN PATENT DOCUMENTS

| | | |
|---|---|---|
| CA | 648740 A | 9/1962 |
| CA | 2169593 A1 | 8/1996 |

(Continued)

OTHER PUBLICATIONS

Https://www.superatv.com/superatv-inner-tie-rod-end-replacement-polaris.

*Primary Examiner* — Amber R Anderson
*Assistant Examiner* — Kevin J Baynes
(74) *Attorney, Agent, or Firm* — Robinson IP Law, PLLC

(57) ABSTRACT

An adjustable ball joint which is infinitesimally adjustable using a jam nut wherein no set screws are used. A kit for constructing an adjustable ball joint which is infinitesimally adjustable using a jam nut wherein no set screws are used. A method of assembling an adjustable ball joint which is infinitesimally adjustable using a jam nut wherein no set screws are used.

23 Claims, 8 Drawing Sheets

(56) References Cited

U.S. PATENT DOCUMENTS

| | | | | |
|---|---|---|---|---|
| 2,819,918 A | * | 1/1958 | Seaquist | F16C 11/0676 403/134 |
| 2,954,993 A | | 10/1960 | Scheublein, Jr. et al. | |
| 3,061,344 A | * | 10/1962 | Gray | F16C 11/0676 29/898.051 |
| 3,423,114 A | * | 1/1969 | Gottschald | F16C 11/0671 403/138 |
| 3,460,650 A | * | 8/1969 | Henry-Biabaud | F16C 11/0628 277/635 |
| 3,508,300 A | | 4/1970 | Allard et al. | |
| 3,537,737 A | * | 11/1970 | Ortheil | F16C 11/0614 403/140 |
| 4,069,864 A | * | 1/1978 | Novoryta | F17C 13/008 165/185 |
| 4,105,344 A | * | 8/1978 | Rousom | B25B 5/102 403/77 |
| 4,120,597 A | * | 10/1978 | Millard | F16C 11/0628 403/138 |
| 4,187,033 A | * | 2/1980 | Zukowski | F16C 11/0647 280/93.511 |
| 4,193,707 A | * | 3/1980 | Doden | F16C 11/0642 403/135 |
| 4,226,440 A | * | 10/1980 | Chappell | B60G 7/005 280/43 |
| 4,243,192 A | * | 1/1981 | Johnson | B64C 3/40 384/208 |
| 4,304,252 A | * | 12/1981 | Stanton | F16K 27/067 251/315.1 |
| 4,440,186 A | * | 4/1984 | Lottner | A61H 3/0288 135/84 |
| 4,568,216 A | * | 2/1986 | Mizusawa | F16C 11/0657 403/143 |
| 4,613,250 A | * | 9/1986 | Laucus | F16C 11/0619 29/402.06 |
| 5,116,159 A | * | 5/1992 | Kern, Jr. | F16C 11/0642 29/898.047 |
| 5,188,477 A | * | 2/1993 | Idosako | F16C 11/0638 403/138 |
| 5,372,373 A | * | 12/1994 | Reel | F16C 11/045 384/208 |
| 5,529,316 A | | 6/1996 | Mattila | |
| 5,885,022 A | * | 3/1999 | Maughan | F16C 11/0642 403/135 |
| 6,082,721 A | * | 7/2000 | Kingsley | F16C 23/04 411/359 |
| 6,213,675 B1 | * | 4/2001 | Ungruh | F16C 11/0633 29/898.047 |
| 6,382,865 B1 | * | 5/2002 | Paxman | F16C 11/0609 403/139 |
| 6,386,564 B1 | | 5/2002 | Kincad et al. | |
| 6,561,715 B2 | * | 5/2003 | Wasylewski | B62D 7/16 403/70 |
| 8,757,648 B1 | * | 6/2014 | Winter | B60G 7/005 403/77 |
| 8,794,860 B1 | * | 8/2014 | McGean | F16C 11/0642 403/137 |
| 8,979,055 B2 | * | 3/2015 | Chu | F16M 11/14 248/278.1 |
| 9,951,808 B2 | * | 4/2018 | Romano | F16C 11/0628 |
| 9,982,711 B1 | * | 5/2018 | Henriksen | F16C 11/0642 |
| 10,300,946 B2 | | 5/2019 | Duff | |
| 10,308,089 B2 | * | 6/2019 | Elterman | F16C 11/0685 |
| 10,962,047 B1 | | 3/2021 | Connell et al. | |
| 11,698,101 B2 | * | 7/2023 | Paerewyck | F16C 11/08 403/133 |
| 11,760,145 B1 | * | 9/2023 | Kirklin | F16C 11/0671 403/122 |
| 11,773,891 B2 | * | 10/2023 | Juillet | B25B 23/108 81/436 |
| 2019/0126982 A1 | | 5/2019 | Boyd | |
| 2020/0003252 A1 | | 1/2020 | Smith | |
| 2021/0324906 A1 | * | 10/2021 | Heit | F16C 11/068 |

FOREIGN PATENT DOCUMENTS

| | | | | |
|---|---|---|---|---|
| EP | 1289821 B1 | | 8/2006 | |
| GB | 421984 A | * | 1/1935 | .......... F16C 11/0619 |
| GB | 440670 A | * | 1/1936 | .......... F16C 11/0619 |
| GB | 753234 | | 7/1956 | |
| GB | 1485365 A | * | 9/1977 | .......... F16C 11/0623 |
| WO | WO-9806917 A1 | * | 2/1998 | ............. F16B 35/06 |
| WO | 2009052178 A2 | | 4/2009 | |

* cited by examiner

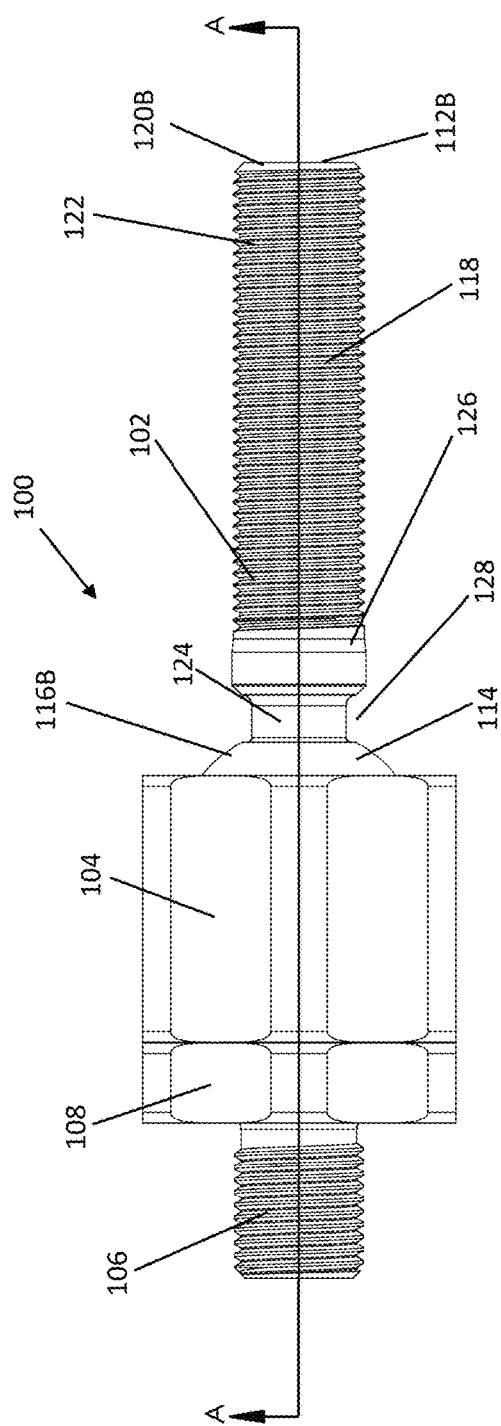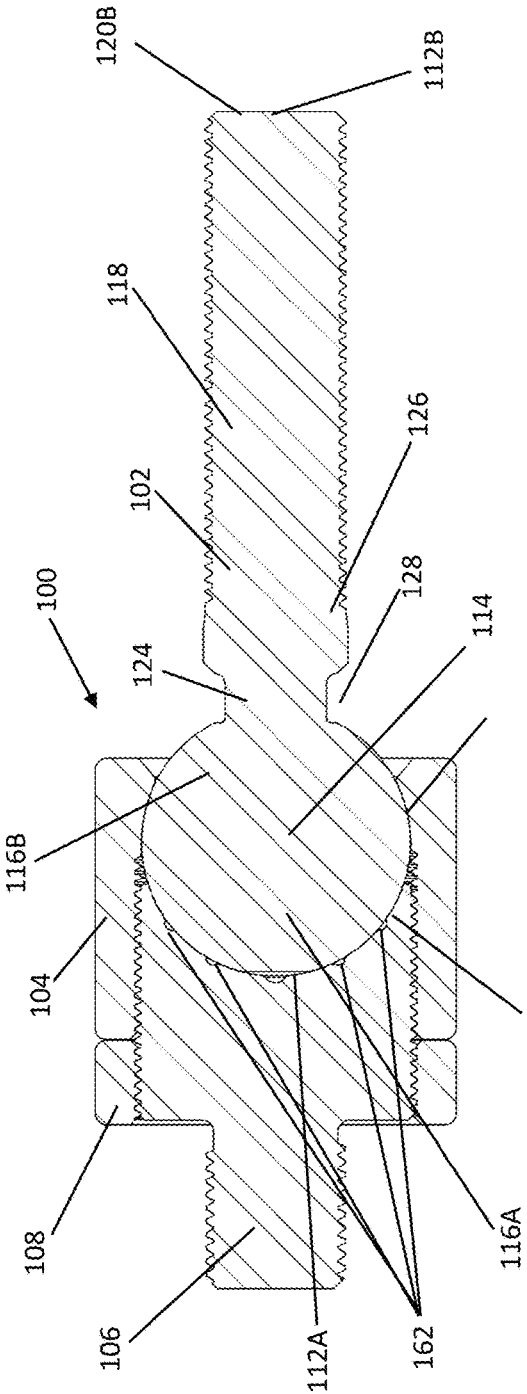

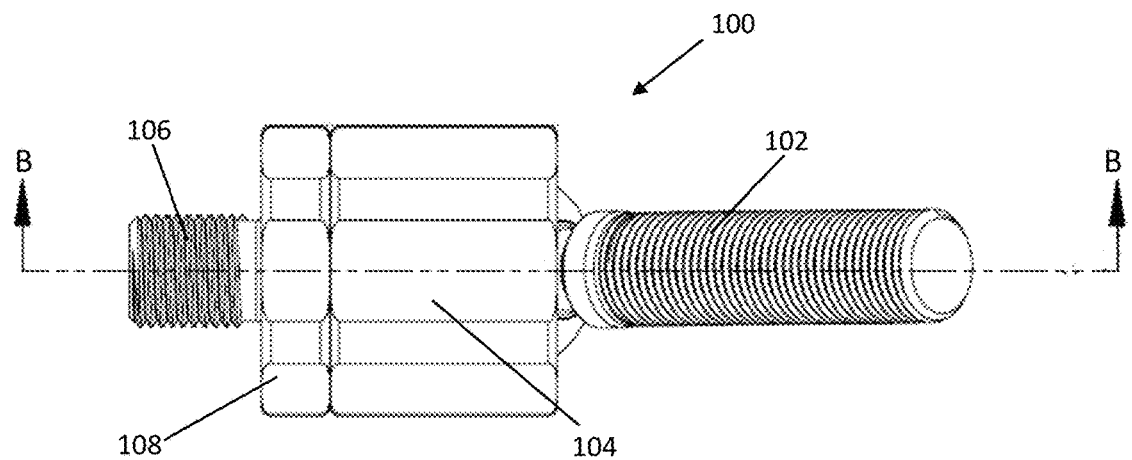
FIG. 5
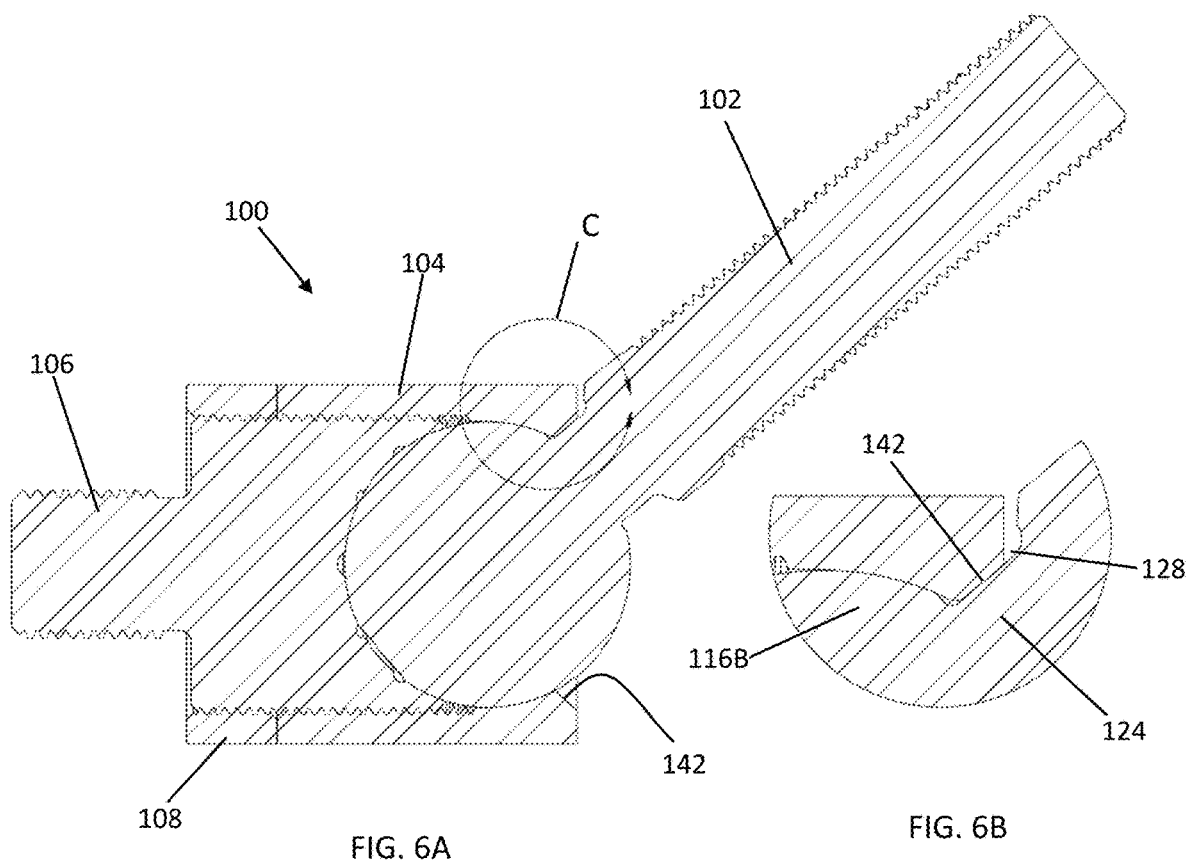
FIG. 6A
FIG. 6B

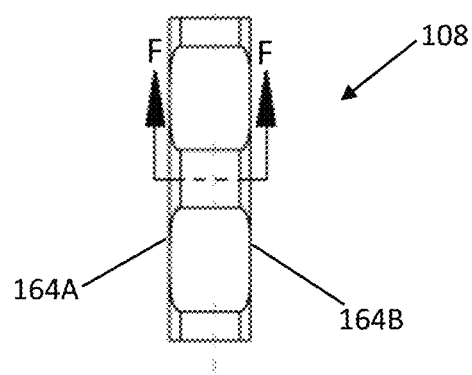
FIG. 10A
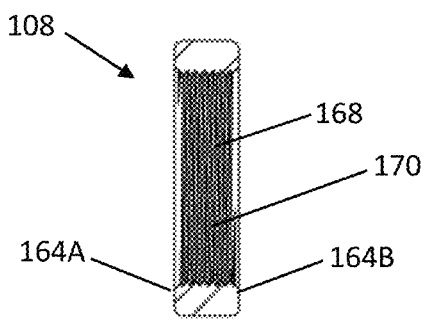
FIG. 10B
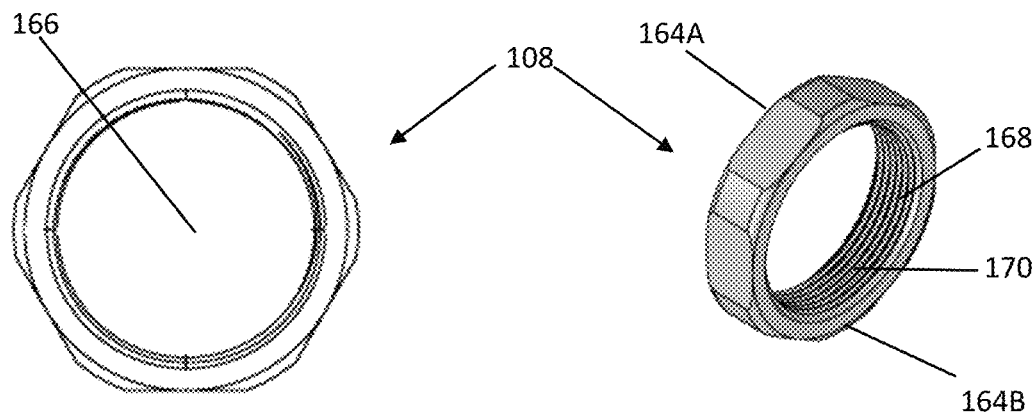
FIG. 10C
FIG. 10D

ADJUSTABLE BALL JOINT FOR AN INNER TIE ROD ASSEMBLY, ADJUSTABLE BALL JOINT KIT, AND METHOD OF ASSEMBLING AN ADJUSTABLE BALL JOINT

FIELD

This disclosure relates to the field of inner tie rod assemblies for vehicles. More particularly, this disclosure relates to a simplified adjustable ball joint for use in inner tie rod assemblies.

BACKGROUND

Inner tie rod assemblies are used on motor vehicles and are typically connected to steering rack or steering gear box. One example is U.S. Pat. No. 1,918,394 entitled "Tie Rod Ball Joint," the entirety of which is incorporated herein by reference. This and other prior art designs are relatively complex and are difficult to adjust. Such designs often employ set screws that are easily lost and that require multiple steps to make adjustments to such devices. It is desirable for inner tie rod assemblies to be adjustable. It is also desirable for inner tie rod assemblies to have simple designs and as few parts as necessary for them to work properly. What is needed, therefore, is a simpler and more easily adjustable ball joint for an inner tie rod assembly.

SUMMARY

The above and other needs are met by an adjustable ball joint apparatus for use in an inner tie rod assembly for a vehicle, the adjustable ball joint apparatus comprising a ball joint stud comprising a ball joint stud first end, a ball joint stud second end, a ball extending from the ball joint stud first end toward the ball joint stud second end, the ball comprising a ball first hemisphere and a ball second hemisphere, and a rod including a first rod end and a second rod end wherein the rod extends from the ball second hemisphere to the ball joint stud second end, and wherein at least a portion of the rod is threaded along an outer surface of the rod; a ball joint hollow body configured to receive the ball of the ball joint stud, the ball joint hollow body further comprising a ball joint hollow body first end, a ball joint hollow body second end, a ball joint hollow body cavity between the ball joint hollow body first end and the ball joint hollow body second end, the ball joint hollow body cavity including a ball joint hollow body cavity internal surface wherein at least a first threaded portion of the ball joint hollow body cavity internal surface is threaded, a ball joint hollow body first aperture along the ball joint hollow body first end, a ball joint hollow body second aperture along the ball joint hollow body second end, wherein the ball joint stud ball is sized to fit through the ball joint hollow body first aperture but not the ball joint hollow body second aperture, and a ball joint hollow body first socket section configured to enclose at least a portion of the ball second hemisphere inside the ball joint hollow body, wherein the ball is physically engaged with the ball joint hollow body; an end piece comprising an end piece first end, an end piece second end, an end piece first section extending from the end piece first end to a transition location, wherein at least a second threaded portion of an end piece first section outer surface is threaded, an end piece second section extending from the transition location to the end piece second end, wherein at least a third threaded portion of an end piece second section outer surface is threaded, and wherein the third threaded portion of the end piece second section outer surface is mated with and is adjustable along the first threaded portion of the cavity internal surface, and an end piece second socket section extending inward from the end piece second end wherein the end piece second socket section is tightened against and encloses at least a portion of the ball first hemisphere wherein the ball, the ball joint hollow body first socket section, and the end piece second socket section are configured to permit the ball to partially rotate; a jam nut comprising a jam nut first end, a jam nut second end, and a jam nut cavity including a jam nut cavity internal surface wherein at least a fourth threaded portion of the jam nut cavity internal surface is threaded, and wherein the fourth threaded portion of the jam nut cavity internal surface is physically engaged with and is adjustable along the third threaded portion of the end piece second section outer surface. The rod described above may further comprise a rod narrow section that extends from the ball second hemisphere to a rod wide section, wherein the rod narrow section has a smaller diameter than the rod wide section. The ball joint hollow body described above may further comprise an outwardly angled annular surface along the ball joint hollow body second end to increase a range of motion for the ball joint stud. The ball joint hollow body described above may further comprise a plurality of flat outer surfaces to facilitate the tightening or loosening of the ball joint hollow body relative to the end piece. The jam nut described above may further comprise a plurality of flat outer surfaces to facilitate the tightening or loosening of the jam nut relative to the end piece. The end piece second socket section described above may further include one or more canals for receiving lubricating fluid. Preferably, the ball joint stud, ball joint hollow body, and piece, and jam nut are all made of a metal or a metal alloy.

In another aspect, an inner tie rod assembly is disclosed, the inner tie rod assembly comprising the adjustable ball joint apparatus described above.

In some embodiments, the adjustable ball joint apparatus of described above may consist of the parts described above.

In some embodiments, the adjustable ball joint apparatus of described above may consist of a ball joint stud comprising a ball joint stud first end, a ball joint stud second end, a ball extending from the ball joint stud first end toward the ball joint stud second end, the ball comprising a ball first hemisphere and a ball second hemisphere, a rod including a first rod end and a second rod end wherein the rod extends from the ball second hemisphere to the ball joint stud second end, and wherein at least a portion of the rod is threaded along an outer surface of the rod, and a rod narrow section that extends from the ball second hemisphere to a rod wide section, and wherein the neck portion has a smaller diameter than the wide section of the rod; a ball joint hollow body configured to receive the ball of the ball joint stud, the ball joint hollow body further comprising a ball joint hollow body first end, a ball joint hollow body second end, a ball joint hollow body cavity between the ball joint hollow body first end and the ball joint hollow body second end, the ball joint hollow body cavity including a ball joint hollow body cavity internal surface wherein at least a first threaded portion of the ball joint hollow body cavity internal surface is threaded, a ball joint hollow body first aperture along the ball joint hollow body first end, a ball joint hollow body second aperture along the ball joint hollow body second end, wherein the ball joint stud ball is sized to fit through the ball joint hollow body first aperture but not the ball joint hollow body second aperture, a ball joint hollow body first socket section configured to enclose at least a portion of the ball second hemisphere inside the ball joint hollow body, wherein the ball is physically engaged with the ball joint hollow body, and an outwardly angled annular surface along the ball joint hollow body second end to increase a range of motion for the ball joint stud; an end piece comprising an end piece first end, an end piece second end, an end piece first section extending from the end piece first end to a transition location, wherein at least a second threaded portion of an end piece first section outer surface is threaded, an end piece second section extending from the transition location to the end piece second end, wherein at least a third threaded portion of an end piece second section outer surface is threaded, and wherein the third threaded portion of the end piece second section outer surface is mated with and is adjustable along the first threaded portion of the cavity internal surface, and an end piece second socket section extending inward from the end piece second end wherein the end piece second socket section is tightened against and encloses at least a portion of the ball first hemisphere wherein the ball, the ball joint hollow body first socket section, and the end piece second socket section are configured to permit the ball to partially rotate; and a jam nut comprising a jam nut first end, a jam nut second end, and a jam nut cavity including a jam nut cavity internal surface wherein at least a fourth threaded portion of the jam nut cavity internal surface is threaded, and wherein the fourth threaded portion of the jam nut cavity internal surface is physically engaged with and is adjustable along the third threaded portion of the end piece second section outer surface. The ball joint hollow body may further comprise a plurality of flat outer surfaces to facilitate the tightening or loosening of the ball joint hollow body relative to the end piece. The jam nut may further comprise a plurality of flat outer surfaces to facilitate the tightening or loosening of the jam nut relative to the end piece. The end piece second socket section may further include one or more canals for receiving lubricating fluid. The ball joint stud, ball joint hollow body, and piece, and jam nut are all preferably made of a metal or a metal alloy.

In another aspect, a kit for assembling an adjustable ball joint apparatus for use in an inner tie rod assembly for a vehicle is disclosed, the kit comprising a ball joint stud comprising a ball joint stud first end, a ball joint stud second end, a ball extending from the ball joint stud first end toward the ball joint stud second end, the ball comprising a ball first hemisphere and a ball second hemisphere, and a rod including a first rod end and a second rod end wherein the rod extends from the ball second hemisphere to the ball joint stud second end, and wherein at least a portion of the rod is threaded along an outer surface of the rod. The kit further comprises a ball joint hollow body configured to receive the ball of the ball joint stud, the ball joint hollow body, the ball joint hollow body further comprising a ball joint hollow body first end; a ball joint hollow body second end; a ball joint hollow body cavity between the ball joint hollow body first end and the ball joint hollow body second end, the ball joint hollow body cavity including a ball joint hollow body cavity internal surface wherein at least a first threaded portion of the ball joint hollow body cavity internal surface is threaded; a ball joint hollow body first aperture along the ball joint hollow body first end; a ball joint hollow body second aperture along the ball joint hollow body second end, wherein the ball joint stud ball is sized to fit through the ball joint hollow body first aperture but not the ball joint hollow body second aperture; and a ball joint hollow body first socket section configured to enclose at least a portion of the ball second hemisphere inside the ball joint hollow body. The kit further comprises an end piece comprising an end piece first end; an end piece second end; an end piece first section extending from the end piece first end to a transition location, wherein at least a second threaded portion of an end piece first section outer surface is threaded; an end piece second section extending from the transition location to the end piece second end, wherein at least a third threaded portion of an end piece second section outer surface is threaded, and wherein the third threaded portion of the end piece second section outer surface is shaped and sized to mate with and be adjustable along the first threaded portion of the cavity internal surface; and an end piece second socket section extending inward from the end piece second end wherein the end piece second socket section is shaped and sized to enclose at least a portion of the ball first hemisphere wherein the ball, the ball joint hollow body first socket section, and the end piece second socket section are configured to permit the ball to partially rotate. The kit further comprises a jam nut comprising a jam nut first end; a jam nut second end; and a jam nut cavity including a jam nut cavity internal surface wherein at least a fourth threaded portion of the jam nut cavity internal surface is threaded, and wherein the fourth threaded portion of the jam nut cavity internal surface is shaped and sized to mate with and be adjustable along the third threaded portion of the end piece second section outer surface. Preferably, the rod further comprises a rod narrow section that extends from the ball second hemisphere to a rod wide section, and wherein the rod narrow section has a smaller diameter than the rod wide section. Preferably, the ball joint hollow body further comprises an outwardly angled annular surface along the ball joint hollow body second end to increase a range of motion for the ball joint stud. Preferably, the ball joint hollow body further comprises a plurality of flat outer surfaces to facilitate the tightening or loosening of the ball joint hollow body relative to the end piece. Preferably, the jam nut further comprises a plurality of flat outer surfaces to facilitate the tightening or loosening of the jam nut relative to the end piece. Preferably, the end piece second socket section includes one or more canals for receiving lubricating fluid. Preferably, the ball joint stud, ball joint hollow body, and piece, and jam nut are all made of a metal or a metal alloy.

In another aspect, a method of assembling an adjustable ball joint apparatus is disclosed. The method comprises providing a ball joint stud comprising a ball joint stud first end; a ball joint stud second end; a ball extending from the ball joint stud first end toward the ball joint stud second end, the ball comprising a ball first hemisphere and a ball second hemisphere; and a rod including a first rod end and a second rod end wherein the rod extends from the ball second hemisphere to the ball joint stud second end, and wherein at least a portion of the rod is threaded along an outer surface of the rod. The method further comprises providing a ball joint hollow body configured to receive the ball of the ball joint stud, the ball joint hollow body comprising a ball joint hollow body first end; a ball joint hollow body second end; a ball joint hollow body cavity between the ball joint hollow body first end and the ball joint hollow body second end, the ball joint hollow body cavity including a ball joint hollow body cavity internal surface wherein at least a first threaded portion of the ball joint hollow body cavity internal surface is threaded; a ball joint hollow body first aperture along the ball joint hollow body first end; a ball joint hollow body second aperture along the ball joint hollow body second end, wherein the ball joint stud ball is sized to fit through the ball joint hollow body first aperture but not the ball joint hollow body second aperture; and a ball joint hollow body first socket section configured to enclose at least a portion of the ball second hemisphere inside the ball joint hollow body. The method further comprises providing an end piece comprising an end piece first end; an end piece second end; an end piece first section extending from the end piece first end to a transition location, wherein at least a second threaded portion of an end piece first section outer surface is threaded; an end piece second section extending from the transition location to the end piece second end, wherein at least a third threaded portion of an end piece second section outer surface is threaded, and wherein the third threaded portion of the end piece second section outer surface is shaped and sized to mate with and be adjustable along the first threaded portion of the cavity internal surface; and an end piece second socket section extending inward from the end piece second end wherein the end piece second socket section is shaped and sized to enclose at least a portion of the ball first hemisphere wherein the ball, the ball joint hollow body first socket section, and the end piece second socket section are configured to permit the ball to partially rotate. The method further comprises providing a jam nut comprising a jam nut first end; a jam nut second end; and a jam nut cavity including a jam nut cavity internal surface wherein at least a fourth threaded portion of the jam nut cavity internal surface is threaded, and wherein the fourth threaded portion of the jam nut cavity internal surface is shaped and sized to mate with and be adjustable along the third threaded portion of the end piece second section outer surface. The method further comprises inserting the ball joint stud into the ball joint hollow body cavity starting with the ball joint stud second end entering the ball joint hollow body first end until the ball second hemisphere contacts the ball joint hollow body first socket section; and engaging the third threaded portion of the end piece second section outer surface with the first threaded portion of the ball joint hollow body cavity internal surface and rotating the ball joint hollow body relative to the end piece to insert a portion of the end piece into the ball joint hollow body cavity until the end piece second socket section contacts the ball first hemisphere. The method preferably further comprises engaging the fourth threaded portion of the jam nut cavity internal surface with the third threaded portion of the end piece second section outer surface and rotating the jam nut relative to the end piece to tighten the jam nut onto the end piece. The rod preferably further comprises a rod narrow section that extends from the ball second hemisphere to a rod wide section, and wherein the rod narrow section has a smaller diameter than the rod wide section. The ball joint hollow body preferably further comprises an outwardly angled annular surface along the ball joint hollow body second end to increase a range of motion for the ball joint stud. The ball joint hollow body preferably further comprises a plurality of flat outer surfaces to facilitate the tightening or loosening of the ball joint hollow body relative to the end piece. The jam nut preferably further comprises a plurality of flat outer surfaces to facilitate the tightening or loosening of the jam nut relative to the end piece. The end piece second socket section preferably includes one or more canals for receiving lubricating fluid. Preferably, the ball joint stud, ball joint hollow body, and piece, and jam nut are all made of a metal or a metal alloy.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 1 shows a side view of an assembled adjustable ball joint;

FIG. 2 shows a cross-sectional view of the assembled adjustable ball joint of FIG. 1 cut along line A-A;

FIG. 5 shows a side view of the assembled adjustable ball joint of FIG. 1 wherein a ball joint stud as moved relative to relative to a ball joint hollow body;

FIG. 6A shows the assembled adjustable ball joint of FIG. 5 cut along line B-B;

FIG. 6B shows a close up of section C from FIG. 6A;

FIG. 10A shows a side view of a jam nut;

FIG. 10B shows a cross-sectional view of the jam nut of FIG. 10A cut along line F-F;

FIG. 10C shows an end view of the jam nut of FIG. 10A;

FIG. 10D shows a perspective view of the jam nut shown in FIG. 10A; and

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Figure 3:
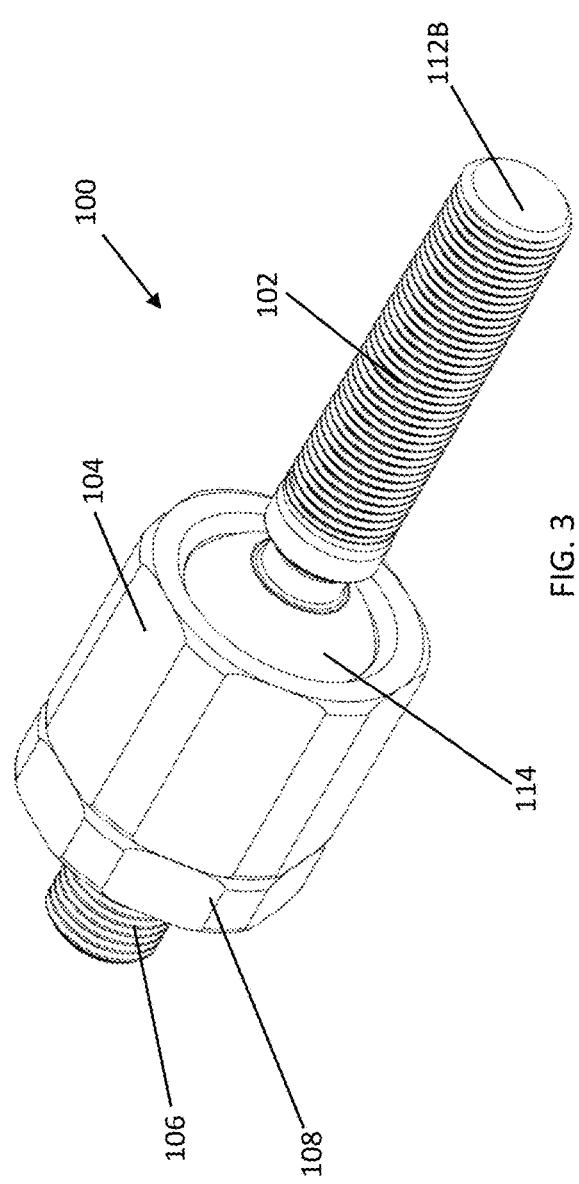
FIG. 3 shows a perspective view of the assembled adjustable ball joint shown in FIG. 1.
Figure 4:
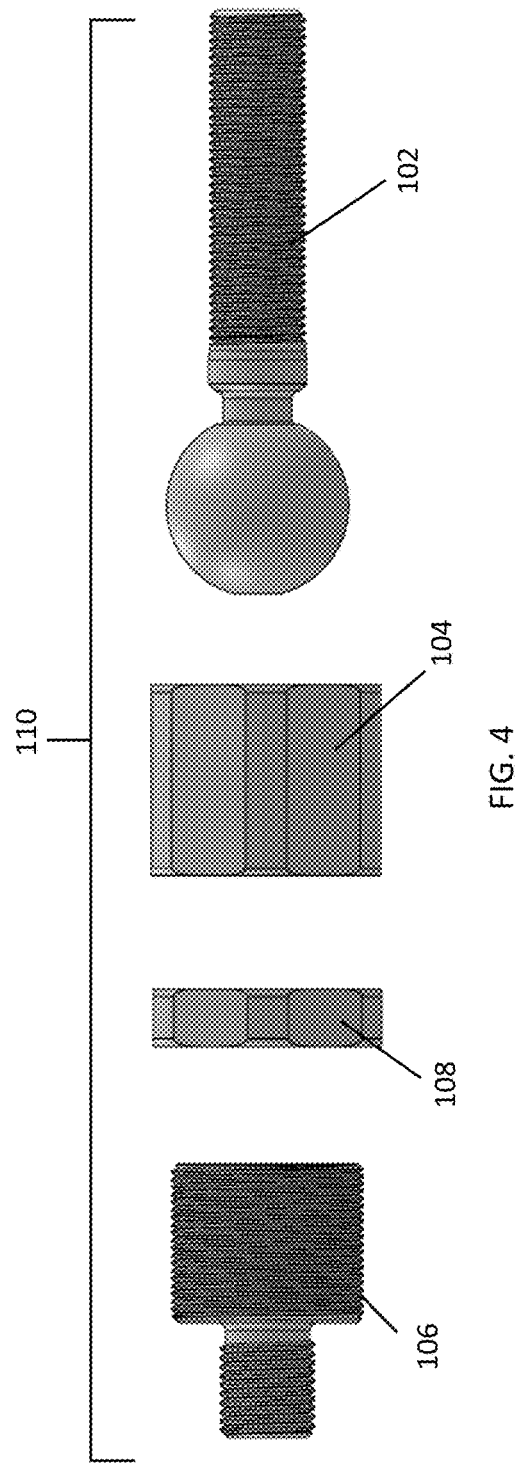
FIG. 4 shows a side view of a kit of parts that can be combined to form the assembled adjustable ball joint shown in FIG. 1.

An adjustable ball joint 100 is disclosed which has a very simplified design with minimal parts. Preferably, the adjustable ball joint 100 includes only four parts. In such preferred embodiment, those parts include a ball joint stud 102, a ball joint hollow body 104, an end piece 106, and a jam nut 108. A fully assembled version of the adjustable ball joint 100 is shown in FIG. 1. FIG. 2 shows a cross-sectional view of the fully assembled adjustable ball joint cut along line A-A. FIG. 3 shows a perspective view of the fully assembled adjustable ball joint 100. FIG. 4 shows a kit 110 for an adjustable ball joint 100 including the ball joint stud 102, the ball joint follow body 104, the end piece 106, and the jam nut 108 as described in more detail below. FIGS. 5 and 6 show the adjustable ball joint 100 with the ball joint stud 102 rotated showing an example of the range of motion of the ball joint stud 102.

Figure 7A:
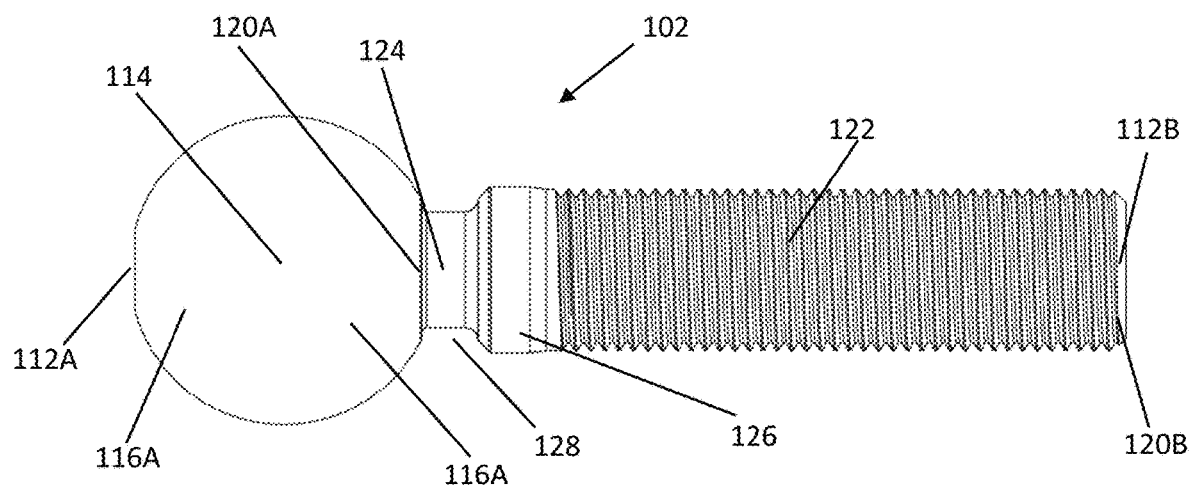
FIG. 7A shows a side view of a ball joint stud.
Figure 7B:
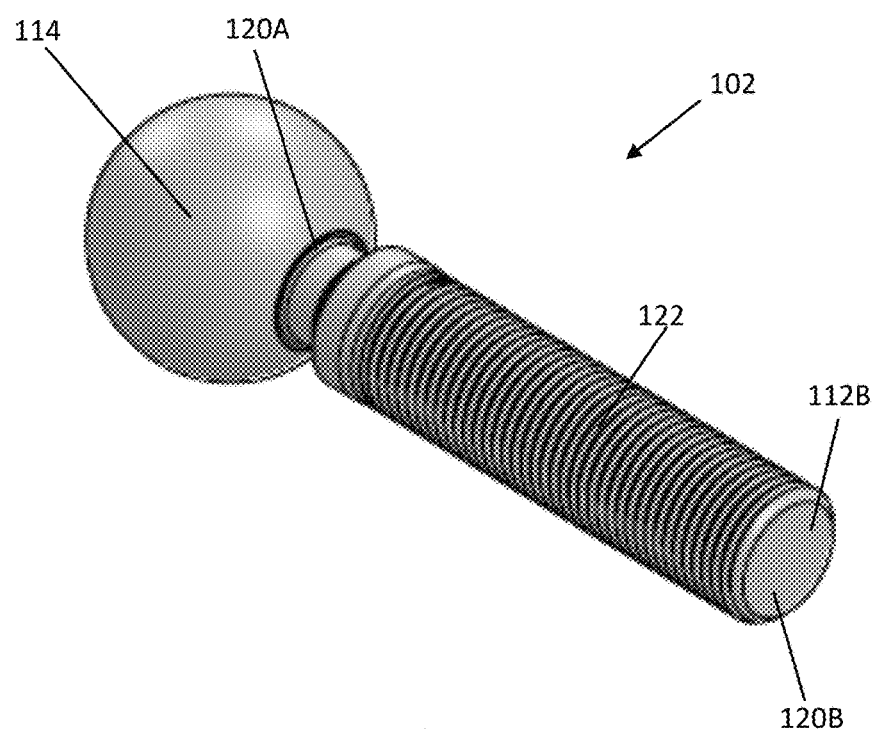
FIG. 7B shows a perspective view of the ball joint stud shown in FIG. 7A.
Figure 8A:
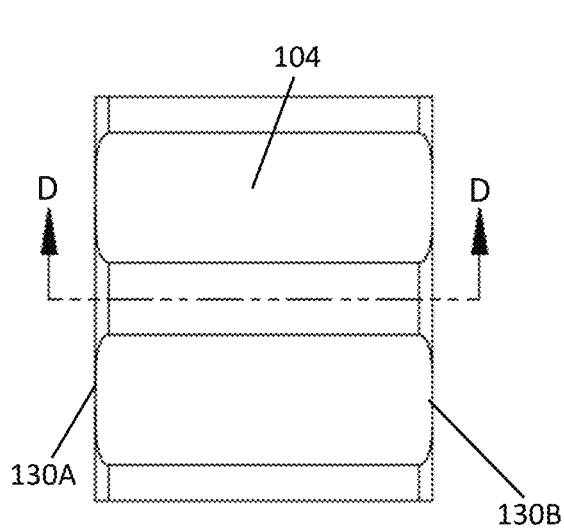
FIG. 8A shows a side view of a ball joint hollow body.
Figure 8B:
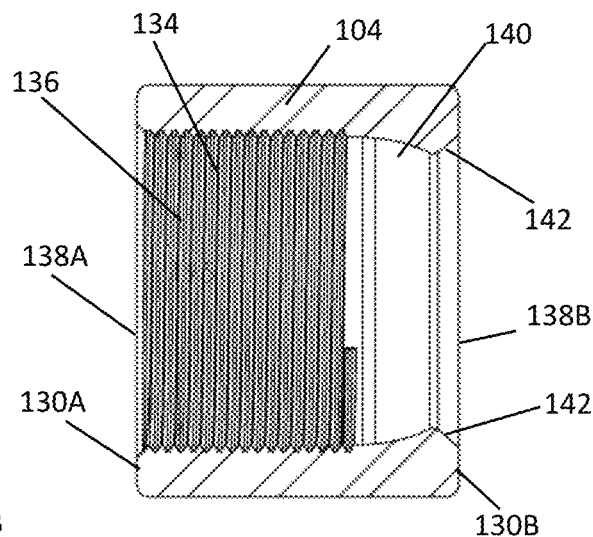
FIG. 8B shows a cross-sectional view of the ball joint hollow body of FIG. 8A cut along line D-D.
Figure 8C:
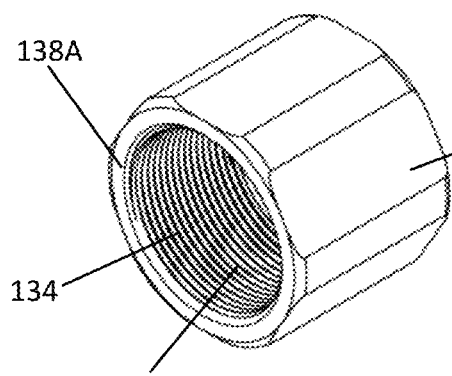
FIG. 8C shows a first perspective view of the ball joint hollow body shown in FIG. 8A.
Figure 8D:
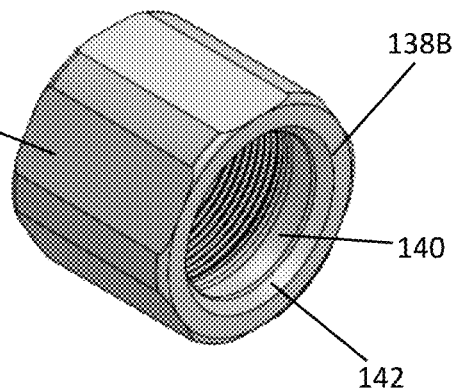
FIG. 8D shows a second perspective view of the ball joint hollow body shown in FIG. 8A.
Figure 8E:
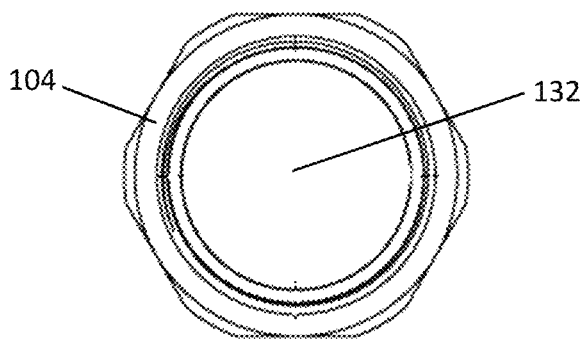
FIG. 8E shows an end view of the ball joint hollow body shown in FIG. 8A.

The ball joint stud 102 is shown by itself in FIG. 7. The ball joint stud 102 includes a ball joint stud first end 112A; a ball joint stud second end 112B; and a ball 114 extending from the ball joint stud first end 112A toward the ball joint stud second end 112B, the ball 114 including a ball first hemisphere 116A and a ball second hemisphere 116B. The ball joint stud 102 further includes a rod 118 including a first rod end 120A and a second rod end 120B. Starting at the first rod end 120A, the rod 118 extends from the ball second hemisphere 116B to the ball joint stud second end 112B (which also forms the second rod end 120B). At least a portion of the rod 118 is threaded along an outer surface 122 of the rod 118. The ball joint stud 102 is preferably formed as a single piece with all parts thereof joined together during manufacturing of the ball joint stud 102. The ball joint stud 102 can be manufactured using molding techniques, machining techniques, extrusion techniques, casting techniques, or any other method for making mechanical parts known to a person having ordinary skill in the art. The ball joint stud 102 is preferably made of metal or a metal alloy, but other materials known to persons having ordinary skill in the art may be used to form the ball joint stud 102. In a preferred embodiment, the rod 118 further includes a rod narrow section 124 that extends from the ball second hemisphere 116B to a rod wide section 126, thereby defining an annular space 128. As shown in FIG. 7, the rod narrow section 124 has a smaller diameter than the rod wide section 126. The annular space 128 allows for increased range of motion for the ball joint stud 102 as shown, for example, in FIG. 6A and in a close-up view in FIG. 6B.

The ball joint hollow body 104 is shown by itself in FIGS. 8A-8D. The ball joint hollow body 104 is configured to receive the ball 114 of the ball joint stud 102. The ball joint hollow body 104 includes a ball joint hollow body first end 130A and a ball joint hollow body second end 130B. A ball joint hollow body cavity 132 is defined between the ball joint hollow body first end 130A and the ball joint hollow body second end 130B. The ball joint hollow body cavity 132 includes a ball joint hollow body cavity internal surface 134 wherein at least a first threaded portion 136 of the ball joint hollow body cavity internal surface 134 is threaded. The ball joint hollow body 104 further includes a ball joint hollow body first aperture 138A along the ball joint hollow body first end 130A and a ball joint hollow body second aperture 138B along the ball joint hollow body second end 130B, wherein the ball joint stud ball 114 is sized to fit through the ball joint hollow body first aperture 138A but not the ball joint hollow body second aperture 138B. The ball joint hollow body 104 further includes a ball joint hollow body first socket section 140 configured to enclose at least a portion of the ball second hemisphere 116B inside the ball joint hollow body cavity 132. More specifically, as shown in FIGS. 1-3, the ball joint hollow body 104 is partially responsible for physically confining the ball 114 of the ball joint stud 102 inside the ball joint hollow body cavity 132. The ball joint hollow body 104 is preferably formed as a single piece with all parts thereof joined together during manufacturing of the ball joint hollow body 104. The ball joint hollow body 104 can be manufactured using molding techniques, machining techniques, extrusion techniques, casting techniques, or any other method for making mechanical parts known to a person having ordinary skill in the art. The ball joint hollow body 104 is preferably made of metal or a metal alloy, but other materials known to persons having ordinary skill in the art may be used to form the ball joint hollow body 104. In a preferred embodiment, the ball joint hollow body second end 130B includes an outwardly angled annular surface 142 to provide a greater range of motion for the ball joint stud 102 as shown, for example, in FIG. 6A and shown close-up in FIG. 6B.

Figure 9A:
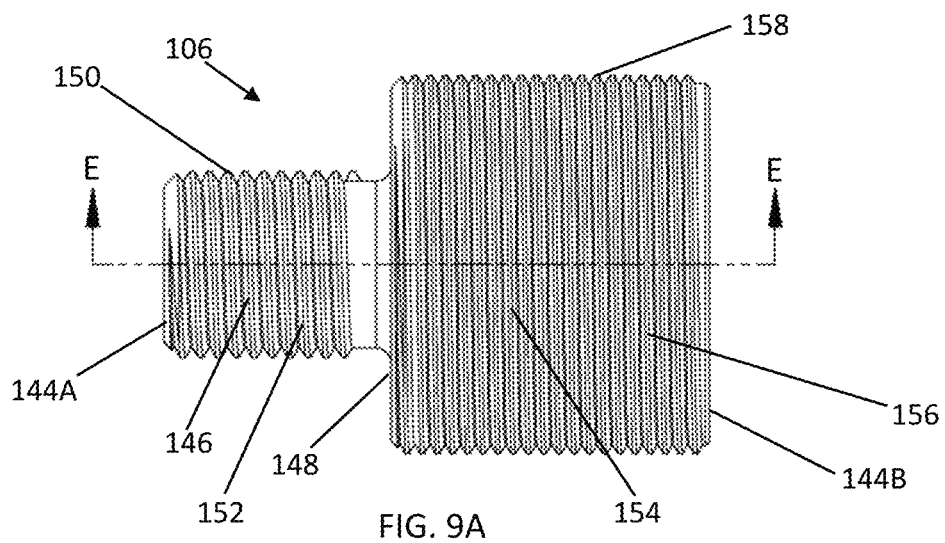
FIG. 9A shows a side view of an end piece.
Figure 9B:
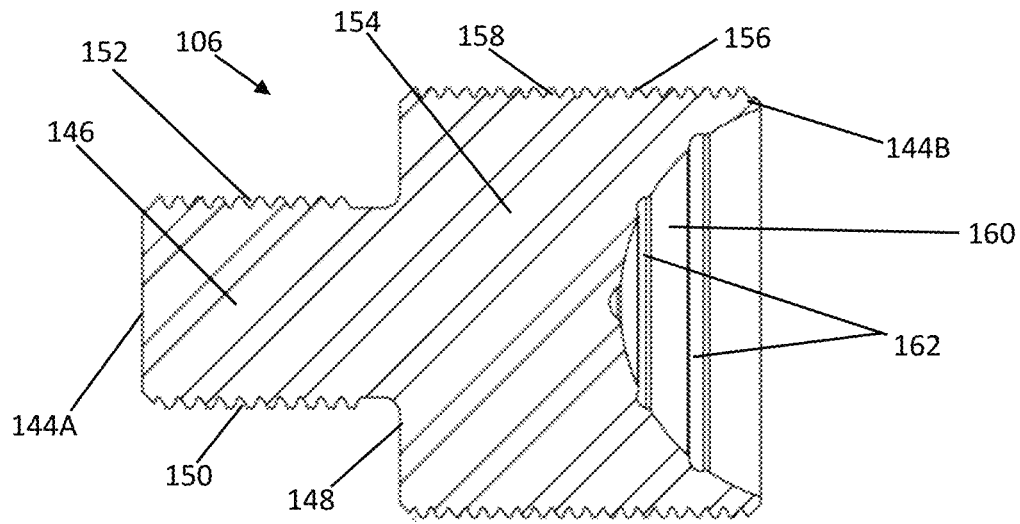
FIG. 9B shows a cross-sectional view of the end piece of FIG. 9A cut along line E-E.
Figure 9C:
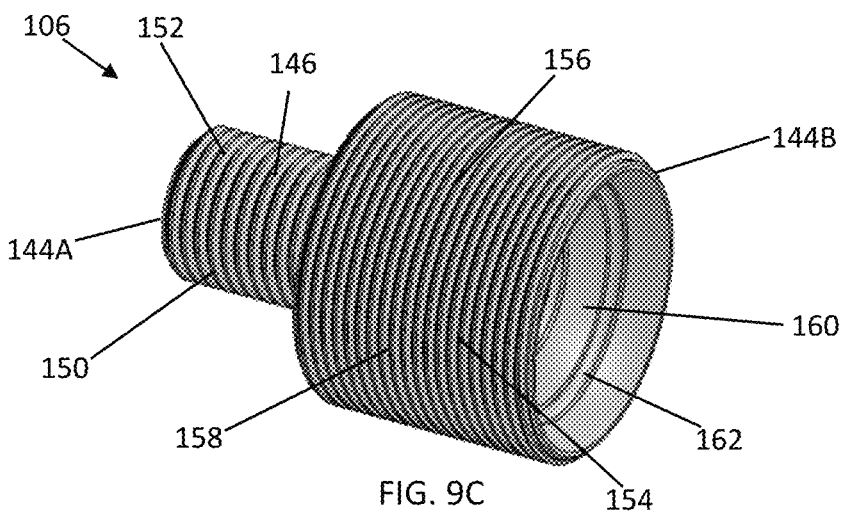
FIG. 9C shows a perspective view of the end piece shown in FIG. 9A.
Figure 11:
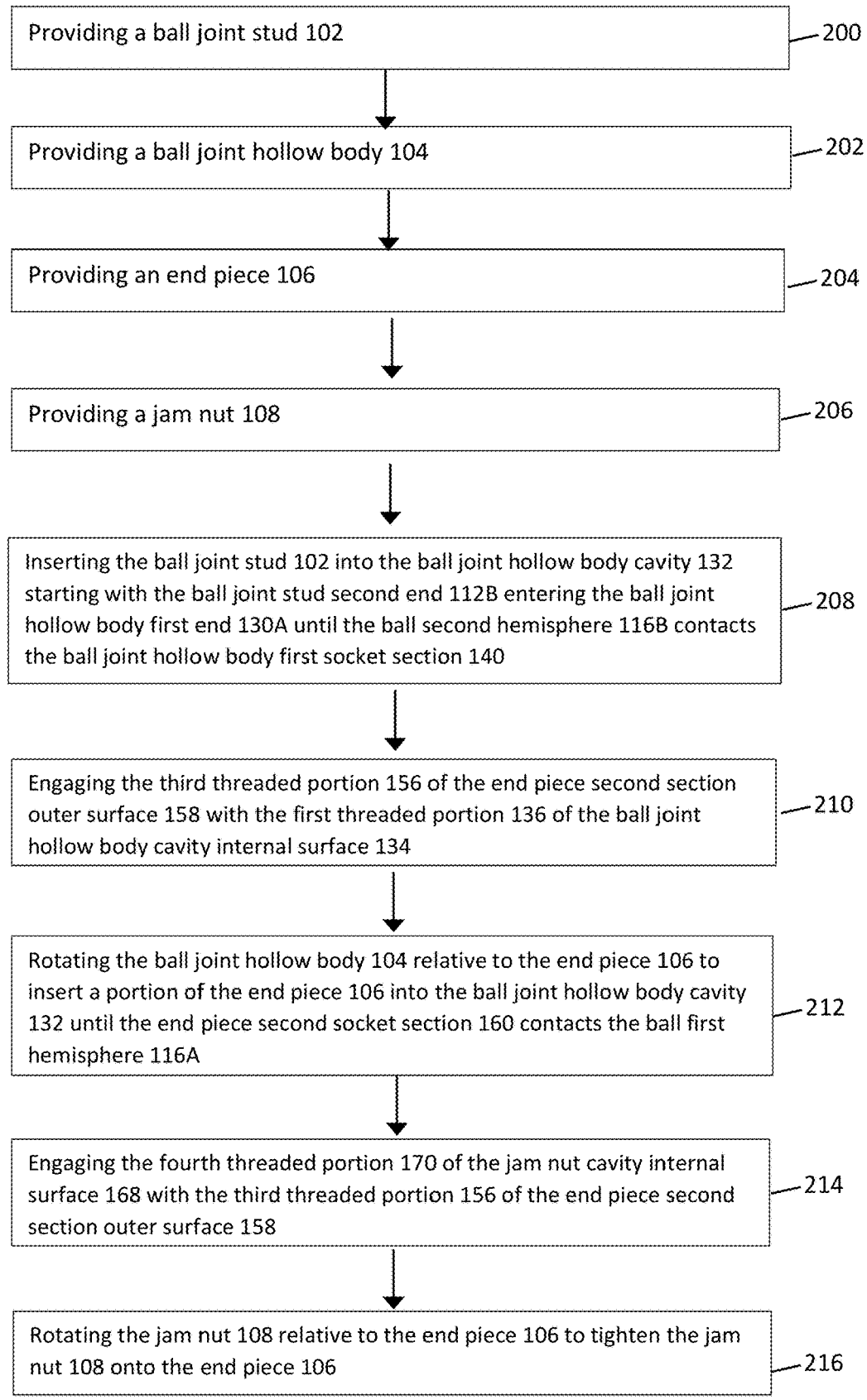
FIG. 11 shows a flow chart of method steps for a method of assembling an adjustable ball joint apparatus.

The end piece 106 is shown by itself in FIGS. 9A-9C. The end piece 106 includes an end piece first end 144A and an end piece second end 144B. The end piece 106 further includes an end piece narrow section 146 extending from the end piece first end 144A to a transition ridge 148, wherein at least a second threaded portion 150 of an end piece narrow section outer surface 152 is threaded. The end piece 106 further includes an end piece wide section 154 extending from the transition ridge 148 to the end piece second end 144B. At least a third threaded portion 156 of an end piece wide section outer surface 158 is threaded. The third threaded portion 156 of the end piece wide section outer surface 158 is mated with and is adjustable along the first threaded portion 136 of the ball joint hollow body cavity internal surface 134 as shown, for example, in FIG. 2. The end piece 106 further includes an end piece second socket section 160 extending inward from the end piece second end 144B wherein the end piece second socket section 160 is used to confine and enclose at least a portion of the ball first hemisphere 116A wherein the ball 114, the ball joint hollow body first socket section 140, and the end piece second socket section 160 are configured to confine the ball 114 in place but also permit the ball 114 (and, therefore, the ball joint stud 102) to move rotationally and have a wide range of motion as shown, for example, in FIGS. 6A and 6B. The end piece 106 preferably further includes one or more canals 162 for receiving lubricating fluid along the end piece second socket section 160. The end piece 106 is preferably formed as a single piece with all parts thereof joined together during manufacturing of the end piece 106. The end piece 106 can be manufactured using molding techniques, machining techniques, extrusion techniques, casting techniques, or any other method for making mechanical parts known to a person having ordinary skill in the art. The end piece 106 is preferably made of metal or a metal alloy, but other materials known to persons having ordinary skill in the art may be used to form the end piece 106.

The jam nut 108 is shown by itself in FIGS. 10A-10D. The jam nut 108 includes a jam nut first end 164A and a jam nut second end 164B. The jam nut 108 further includes a jam nut cavity 166 including a jam nut cavity internal surface 168 wherein at least a fourth threaded portion 170 of the jam nut cavity internal surface 168 is threaded. The fourth threaded portion 170 of the jam nut cavity internal surface 168 is physically engaged with and is adjustable along the third threaded portion 156 of the end piece second section outer surface 158. The jam nut 108 is preferably formed as a single piece with all parts thereof joined together during manufacturing of the jam nut 108. The jam nut 108 can be manufactured using molding techniques, machining techniques, extrusion techniques, casting techniques, or any other method for making mechanical parts known to a person having ordinary skill in the art. The jam nut 108 is preferably made of metal or a metal alloy, but other materials known to persons having ordinary skill in the art may be used to form the jam nut 108.

In addition to the assembled adjustable ball joint 100 described above and the kit 110 for assembling the adjustable ball joint 100 described above, a method for assembling the adjustable ball joint 100 is also disclosed. In a preferred embodiment, the method includes (200) providing the ball joint stud 102, (202) providing the ball joint hollow body 104, (204) providing the end piece 106, and (206) providing the jam nut 108. The method further includes (208) inserting the ball joint stud 102 into the ball joint hollow body cavity 132 starting with the ball joint stud second end 112B entering the ball joint hollow body first end 130A until the ball second hemisphere 116B contacts the ball joint hollow body first socket section 140. The method preferably further includes (210) engaging the third threaded portion 156 of the end piece second section outer surface 158 with the first threaded portion 136 of the ball joint hollow body cavity internal surface 134 and (212) rotating the ball joint hollow body 104 relative to the end piece 106 to insert a portion of the end piece 106 into the ball joint hollow body cavity 132 until the end piece second socket section 160 contacts the ball first hemisphere 116A. Preferably, the method further includes (214) engaging the fourth threaded portion 170 of the jam nut cavity internal surface 168 with the third threaded portion 156 of the end piece second section outer surface 158 and (216) rotating the jam nut 108 relative to the end piece 106 to tighten the jam nut 108 onto the end piece 106.

The previously described embodiments are used as a portion of inner tie rod assemblies on motor vehicles. It is desirable for such assemblies to be adjustable. The previously described embodiments of the present disclosure have many advantages. Some prior art designs have no means for adjustment after wear and tear on the apparatus. Other prior art devices require additional set screws to tighten such apparatuses and these screws wear out easily and are lost easily. Moreover, some devices include finite slots on an end cap that will allow the set screw to retain the end cap and not allow the endcap to unscrew. The prior art slot design does not allow for precise adjustments, only adjustments at predetermined increments. No known prior art devices use jam nuts as described herein for infinitesimal adjustments. The adjustable ball joint 100 described herein is highly adjustable with no extra set screws or associated set screw tools required for retention. In addition to keeping the adjustable ball joint 100 held together tightly, the jam nut 108 also acts to prevent threads on the end piece wide section outer surface 158 from deforming or failing.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What is claimed is:

1. An adjustable ball joint apparatus for use in an inner tie rod assembly for a vehicle, the adjustable ball joint apparatus comprising:
    a ball joint stud comprising:
        a ball joint stud first end;
        a ball joint stud second end;
        a ball extending from the ball joint stud first end toward the ball joint stud second end, the ball comprising a ball first hemisphere and a ball second hemisphere; and
        a rod including a first rod end and a second rod end wherein the rod extends from the ball second hemisphere to the ball joint stud second end, and wherein at least a portion of the rod is threaded along an outer surface of the rod;
    a ball joint hollow body configured to receive the ball of the ball joint stud, the ball joint hollow body further comprising:
        a ball joint hollow body first end;
        a ball joint hollow body second end;
        a ball joint hollow body cavity between the ball joint hollow body first end and the ball joint hollow body second end, the ball joint hollow body cavity including a ball joint hollow body cavity internal surface wherein at least a first threaded portion of the ball joint hollow body cavity internal surface is threaded;
        a ball joint hollow body first aperture along the ball joint hollow body first end;
        a ball joint hollow body second aperture along the ball joint hollow body second end, wherein the ball joint stud ball is sized to fit through the ball joint hollow body first aperture but not the ball joint hollow body second aperture; and
        a ball joint hollow body first socket section configured to enclose at least a portion of the ball second hemisphere inside the ball joint hollow body, wherein the ball is physically engaged with the ball joint hollow body;
    an end piece comprising:
        an end piece first end;
        an end piece second end;
        an end piece first section extending from the end piece first end to a transition location, wherein at least a second threaded portion of an end piece first section outer surface is threaded;
        an end piece second section extending from the transition location to the end piece second end, wherein at least a third threaded portion of an end piece second section outer surface is threaded, and wherein the third threaded portion of the end piece second section outer surface is mated with and is adjustable along the first threaded portion of the cavity internal surface; and
        an end piece second socket section extending inward from the end piece second end wherein the end piece second socket section is tightened against and encloses at least a portion of the ball first hemisphere wherein the ball, the ball joint hollow body first socket section, and the end piece second socket section are configured to permit the ball to partially rotate;

a jam nut comprising:
  a jam nut first end;
  a jam nut second end; and
  a jam nut cavity including a jam nut cavity internal surface wherein at least a fourth threaded portion of the jam nut cavity internal surface is threaded, and wherein the fourth threaded portion of the jam nut cavity internal surface is physically engaged with and is adjustable along the third threaded portion of the end piece second section outer surface.

2. The adjustable ball joint apparatus of claim 1 wherein the rod further comprises a rod narrow section that extends from the ball second hemisphere to a rod wide section, and wherein the rod narrow section has a smaller diameter than the rod wide section.

3. The adjustable ball joint apparatus of claim 1 wherein the ball joint hollow body further comprises an outwardly angled annular surface along the ball joint hollow body second end to increase a range of motion for the ball joint stud.

4. The adjustable ball joint apparatus of claim 1 wherein the ball joint hollow body further comprises a plurality of flat outer surfaces to facilitate the tightening or loosening of the ball joint hollow body relative to the end piece.

5. The adjustable ball joint apparatus of claim 1 wherein the jam nut further comprises a plurality of flat outer surfaces to facilitate the tightening or loosening of the jam nut relative to the end piece.

6. The adjustable ball joint apparatus of claim 1 wherein the end piece second socket section includes one or more canals for receiving lubricating fluid.

7. The adjustable ball joint apparatus of claim 1 wherein the ball joint stud, ball joint hollow body, end piece, and jam nut are all made of a metal or a metal alloy.

8. An inner tie rod assembly comprising the adjustable ball joint apparatus of claim 1.

9. A kit for assembling an adjustable ball joint apparatus for use in an inner tie rod assembly for a vehicle, the kit comprising:
  a ball joint stud comprising:
    a ball joint stud first end;
    a ball joint stud second end;
    a ball extending from the ball joint stud first end toward the ball joint stud second end, the ball comprising a ball first hemisphere and a ball second hemisphere; and
    a rod including a first rod end and a second rod end wherein the rod extends from the ball second hemisphere to the ball joint stud second end, and wherein at least a portion of the rod is threaded along an outer surface of the rod; and
  a ball joint hollow body configured to receive the ball of the ball joint stud, the ball joint hollow body comprising:
    a ball joint hollow body first end;
    a ball joint hollow body second end;
    a ball joint hollow body cavity between the ball joint hollow body first end and the ball joint hollow body second end, the ball joint hollow body cavity including a ball joint hollow body cavity internal surface wherein at least a first threaded portion of the ball joint hollow body cavity internal surface is threaded;
    a ball joint hollow body first aperture along the ball joint hollow body first end;
    a ball joint hollow body second aperture along the ball joint hollow body second end, wherein the ball joint stud ball is sized to fit through the ball joint hollow body first aperture but not the ball joint hollow body second aperture; and
    a ball joint hollow body first socket section configured to enclose at least a portion of the ball second hemisphere inside the ball joint hollow body;
  an end piece comprising:
    an end piece first end;
    an end piece second end;
    an end piece first section extending from the end piece first end to a transition location, wherein at least a second threaded portion of an end piece first section outer surface is threaded;
    an end piece second section extending from the transition location to the end piece second end, wherein at least a third threaded portion of an end piece second section outer surface is threaded, and wherein the third threaded portion of the end piece second section outer surface is shaped and sized to mate with and be adjustable along the first threaded portion of the cavity internal surface; and
    an end piece second socket section extending inward from the end piece second end wherein the end piece second socket section is shaped and sized to enclose at least a portion of the ball first hemisphere wherein the ball, the ball joint hollow body first socket section, and the end piece second socket section are configured to permit the ball to partially rotate; and
  a jam nut comprising:
    a jam nut first end;
    a jam nut second end; and
    a jam nut cavity including a jam nut cavity internal surface wherein at least a fourth threaded portion of the jam nut cavity internal surface is threaded, and wherein the fourth threaded portion of the jam nut cavity internal surface is shaped and sized to mate with and be adjustable along the third threaded portion of the end piece second section outer surface.

10. The kit of claim 9 wherein the rod further comprises a rod narrow section that extends from the ball second hemisphere to a rod wide section, and wherein the rod narrow section has a smaller diameter than the rod wide section.

11. The kit of claim 9 wherein the ball joint hollow body further comprises an outwardly angled annular surface along the ball joint hollow body second end to increase a range of motion for the ball joint stud.

12. The kit of claim 9 wherein the ball joint hollow body further comprises a plurality of flat outer surfaces to facilitate the tightening or loosening of the ball joint hollow body relative to the end piece.

13. The kit of claim 9 wherein the jam nut further comprises a plurality of flat outer surfaces to facilitate the tightening or loosening of the jam nut relative to the end piece.

14. The kit of claim 9 wherein the end piece second socket section includes one or more canals for receiving lubricating fluid.

15. The kit of claim 9 wherein the ball joint stud, ball joint hollow body, end piece, and jam nut are all made of a metal or a metal alloy.

16. A method of assembling an adjustable ball joint apparatus, the method comprising:
  providing a ball joint stud comprising:
    a ball joint stud first end;

a ball joint stud second end;
a ball extending from the ball joint stud first end toward the ball joint stud second end, the ball comprising a ball first hemisphere and a ball second hemisphere; and
a rod including a first rod end and a second rod end wherein the rod extends from the ball second hemisphere to the ball joint stud second end, and wherein at least a portion of the rod is threaded along an outer surface of the rod;
providing a ball joint hollow body configured to receive the ball of the ball joint stud, the ball joint hollow body comprising:
a ball joint hollow body first end;
a ball joint hollow body second end;
a ball joint hollow body cavity between the ball joint hollow body first end and the ball joint hollow body second end, the ball joint hollow body cavity including a ball joint hollow body cavity internal surface wherein at least a first threaded portion of the ball joint hollow body cavity internal surface is threaded;
a ball joint hollow body first aperture along the ball joint hollow body first end;
a ball joint hollow body second aperture along the ball joint hollow body second end, wherein the ball joint stud ball is sized to fit through the ball joint hollow body first aperture but not the ball joint hollow body second aperture; and
a ball joint hollow body first socket section configured to enclose at least a portion of the ball second hemisphere inside the ball joint hollow body;
providing an end piece comprising:
an end piece first end;
an end piece second end;
an end piece first section extending from the end piece first end to a transition location, wherein at least a second threaded portion of an end piece first section outer surface is threaded;
an end piece second section extending from the transition location to the end piece second end, wherein at least a third threaded portion of an end piece second section outer surface is threaded, and wherein the third threaded portion of the end piece second section outer surface is shaped and sized to mate with and be adjustable along the first threaded portion of the cavity internal surface;
an end piece second socket section extending inward from the end piece second end wherein the end piece second socket section is shaped and sized to enclose at least a portion of the ball first hemisphere wherein the ball, the ball joint hollow body first socket section, and the end piece second socket section are configured to permit the ball to partially rotate;
providing a jam nut comprising:
a jam nut first end;
a jam nut second end; and
a jam nut cavity including a jam nut cavity internal surface wherein at least a fourth threaded portion of the jam nut cavity internal surface is threaded, and wherein the fourth threaded portion of the jam nut cavity internal surface is shaped and sized to mate with and be adjustable along the third threaded portion of the end piece second section outer surface;
inserting the ball joint stud into the ball joint hollow body cavity starting with the ball joint stud second end entering the ball joint hollow body first end until the ball second hemisphere contacts the ball joint hollow body first socket section; and
engaging the third threaded portion of the end piece second section outer surface with the first threaded portion of the ball joint hollow body cavity internal surface and rotating the ball joint hollow body relative to the end piece to insert a portion of the end piece into the ball joint hollow body cavity until the end piece second socket section contacts the ball first hemisphere.

17. The method of claim 16 further comprising engaging the fourth threaded portion of the jam nut cavity internal surface with the third threaded portion of the end piece second section outer surface and rotating the jam nut relative to the end piece to tighten the jam nut onto the end piece.

18. The method of claim 17 wherein the rod further comprises a rod narrow section that extends from the ball second hemisphere to a rod wide section, and wherein the rod narrow section has a smaller diameter than the rod wide section.

19. The method of claim 17 wherein the ball joint hollow body further comprises an outwardly angled annular surface along the ball joint hollow body second end to increase a range of motion for the ball joint stud.

20. The method of claim 17 wherein the ball joint hollow body further comprises a plurality of flat outer surfaces to facilitate the tightening or loosening of the ball joint hollow body relative to the end piece.

21. The method of claim 17 wherein the jam nut further comprises a plurality of flat outer surfaces to facilitate the tightening or loosening of the jam nut relative to the end piece.

22. The method of claim 17 wherein the end piece second socket section includes one or more canals for receiving lubricating fluid.

23. The method of claim 17 wherein the ball joint stud, ball joint hollow body, end piece, and jam nut are all made of a metal or a metal alloy.

* * * * *